United States Patent [19]
Tani et al.

[11] Patent Number: 5,112,677
[45] Date of Patent: May 12, 1992

[54] ELECTRET SHEET AND A METHOD FOR THE PRODUCTION OF THE SAME

[75] Inventors: Yatsuhiro Tani; Satoshi Takase, both of Ohtsu, Japan

[73] Assignee: Toyo Boseki Kabushiki Kaisha, Osaka, Japan

[21] Appl. No.: 276,617

[22] Filed: Nov. 28, 1988

[30] Foreign Application Priority Data

Nov. 28, 1987 [JP] Japan .................................. 62-301302
Apr. 6, 1988 [JP] Japan .................................. 63-85985

[51] Int. Cl.⁵ ..................... D03D 25/00; H01B 19/00; B32B 33/00
[52] U.S. Cl. ..................................... 428/240; 428/241; 428/242; 428/283; 428/312.8; 428/317.9; 29/631.1; 55/155; 55/DIG. 39

[58] Field of Search ............... 428/240, 241, 242, 197, 428/208, 210, 206, 288, 283, 312.8, 317.9; 55/103, 155, DIG. 39; 29/631.1

[56] References Cited

U.S. PATENT DOCUMENTS 4,185,972 1/1980 Nitta et al. ............................ 55/103
4,456,648 4/1984 Adamse et al. ..................... 428/288
4,774,129 9/1988 Komiyama ....................... 428/317.9

Primary Examiner—George F. Lesmes
Assistant Examiner—Terrel Morris
Attorney, Agent, or Firm—Leydig, Voit & Mayer

[57] ABSTRACT

An electret sheet comprises a porous sheet made of a dielectric polymer and at least one solid material selected from the group consisting of organic materials, inorganic materials, and metallic materials, the porous sheet having the material spaced at various intervals and a method for the manufacture of the said electret sheet.

6 Claims, 2 Drawing Sheets

ELECTRET SHEET AND A METHOD FOR THE PRODUCTION OF THE SAME

BACKGROUND OF THE INVENTION

1. Field of the Invention

This invention relates to an electret sheet which is suitable for use as an air filter, a mask, or the like, and to a method of manufacturing the same. The air filter can be used for purifying the air contained within a clean room, air which is to be supplied to buildings, or gas discharged by factories. The air filter can be attached to an air cleaner, a vacuum cleaner, a copying machine, or the like.

2. Description of the Prior Art

There have been proposed techniques for efficiently collecting dust in the air by use of an electrified sheet. Japanese Patent Publication No. 56-47299 discloses a method of manufacturing an electret sheet as follows: A film made of a dielectric material is electrified and then split into fibers, which are formed into the electret sheet.

With the method mentioned above, an electrified film having a great amount of electrostatic charge can be obtained, but it is impossible to form fibers with a sufficiently small width from the film. Accordingly, the cross-section of each fiber is rectangular, which results in a low collection efficiency of the electret sheet formed from the fibers. When a filter formed from the electret sheet is used over a long period of time, the collection efficiency and the amount of electrostatic charges of the filter gradually decrease with the passage of time, based on the neutralization of static electricity, and will not be restored.

There is disclosed a technique in Japanese Patent Publication No. 53-40073 as follows: A film made of an insulating film and a sheet formed from fibers are successively disposed in that order on an earthed electrode, and then a sheet formed from the fibers is electrified. The resultant electret sheet has a small amount of electrostatic charge, and thus a low collection efficiency.

SUMMARY OF THE INVENTION

The electret sheet of the invention, which overcomes the above-discussed and numerous other disadvantages and deficiencies of the prior art, comprises a porous sheet made of a dielectric polymer and at least one solid material selected from the group consisting of organic materials, inorganic materials, and metallic materials, the said porous sheet having the said material at various intervals.

In a preferred embodiment, the porous sheet mentioned above is selected from the group consisting of textile fabrics, knitted fabrics, non-woven fabrics, porous films, and porous foams.

In a preferred embodiment, the dielectric polymer mentioned above is a fiber selected from the group consisting of fibers made of polyolefin, polyvinylidenechloride, and polycarbonate. Among these fibers, a fiber made of polyolefin is especially preferred.

In a preferred embodiment, the diameter of the fiber mentioned above is in the range of 0.01-100 μm.

In a preferred embodiment, the aforementioned solid material is in the form of particles made of an inorganic material which can be selected from the group consisting of ceramics, metal nitrides, and carbon black or an organic material that is solid at room temperature.

In a preferred embodiment, the size of the particles mentioned above is in the range of 0.001-50 μm.

In a preferred embodiment, the amount of particles to be added to the porous sheet is in the range of 0.01-20% by weight based on the weight of the porous sheet.

In a preferred embodiment, the aforementioned metallic material is selected from the group consisting of silver, copper, aluminum, and tin.

Ina preferred embodiment, the aforementioned organic material is an organic acid that is solid at room temperature or a derivative thereof.

The method of manufacturing the electret sheet of the invention comprises the steps of providing the porous sheet with at least one solid material selected from the group consisting of organic materials and inorganic materials, and of electrifying the porous sheet with the solid material mentioned above.

In a preferred embodiment, corona discharge is conducted in the above-mentioned step of electrifying the porous sheet with the solid material.

In a preferred embodiment, the above-mentioned solid material is heated to vaporize and then the porous sheet is treated with vapor of the material in the above-mentioned step of adding the solid material to the porous sheet.

In a preferred embodiment, the material is sebacic acid, stearic acid, palmitic acid, nonamethylenedicarboxylic acid, or the like, which are solid at room temperature.

Thus, the invention described herein makes possible the objective of (1) providing an electret sheet having a great amount of electrostatic charge; (2) providing an electret sheet the collection efficiency of which does not decrease even after a long period of use, (3) providing an electret sheet which is comparatively thin and contains a small amount of fibers, but has a high collection efficiency; (4) providing an electret sheet which is suitable for use as an air filter, a mask, or the like; and (5) providing a comparatively easy method of manufacturing the aforementioned electret sheet with a high collection efficiency.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
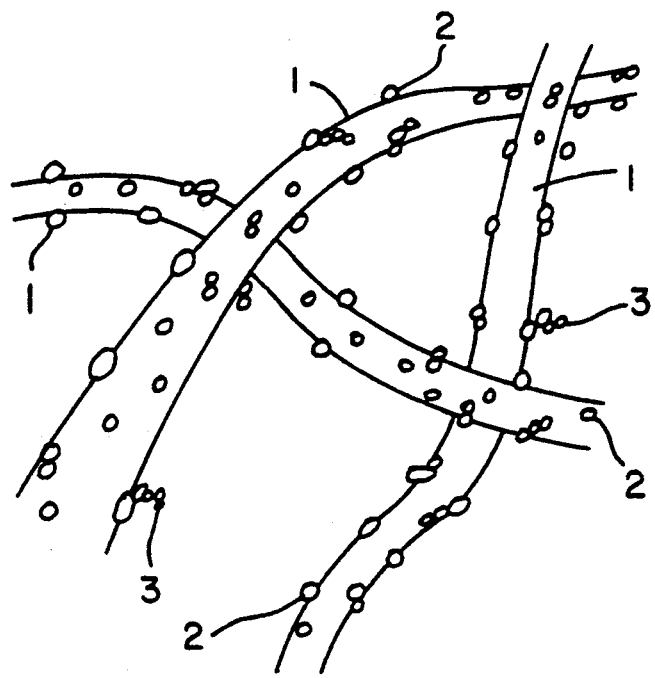
FIG. 1 is a perspective view showing the partially enlarged portion of an electret sheet of the invention.

The invention provides an electret sheet that is obtained by electrifying a porous sheet with a solid material. The solid material is selected from the group consisting of organic materials and inorganic materials, and is added to the porous sheet and spaced at various intervals. The solid material is present in the porous sheet with discontinuity. The distribution of the material throughout the porous sheet is uniform overall in a plane view. The amount of electrostatic charge of the electret sheet is stable over a long period of time, because of the presence of the solid material. Therefore, when the electret sheet is applied to an electret filter or a mask, the collection efficiency of the filter or the mask does not decrease even after a long period of use.

An electret sheet of the invention in which a porous sheet with a solid material is electrified has a great amount of electrostatic charge. The reason for this is not clear, but it has been observed that the potential distribution of the electrified porous sheet with the solid material of the invention is remarkably uniform over the whole surface thereof compared to that of an electrified sheet without the solid material. Therefore, it is probable that when the solid material is brought onto the porous sheet and then electrified, the distribution of the charge injected into the electrified porous sheet with the solid material becomes uniform, which gives rise to the increase in the amount of electrostatic charge of the resultant electret sheet with the solid material.

The dielectric polymer of the invention can be on insulating organic fiber, an insulating film, or an insulating foam, which are formed from insulating resins. These insulating resins can be polypropylene, polyethylene, poly-3-methyl-1-butene, poly-4-methyl-1-pentene, polyvinylidene fluoride, polytetrafluoroethylene, polycarbonate, polystyrene, polyvinylidenechloride, polyvinyl chloride, polyethylene terephthalate, polyamide, polyacrylonitrile, polysulfone, polyphenylene oxide, etc.

Among the above-mentioned insulating resins, polypropylene, poly-3-methyl-1-butene, poly-4-methyl-1-pentene, polyvinylidene fluoride, and polycarbonate are especially preferred.

The dielectric polymer of the invention can be also insulating inorganic fibers which are formed from a borosilicate glass or a quartz glass.

As the porous sheets of the invention, fabric sheets such as non-woven fabrics, textile fabrics, and knitted fabrics; porous films; and porous foams can be used. More particularly, the porous sheets of the invention are formed from non-woven fabrics.

Below, especially preferred embodiments of the invention will be described.

As the porous sheets, non-woven fabrics or woven fabrics in which individual fibers are provided with a plurality of particles on their surfaces can be used. By electrifying the porous sheet having the particles, a great amount of electrostatic charge is retained in the porous sheet with the particles, resulting in an electret sheet with a great amount of electrostatic charge.

Figure 3:
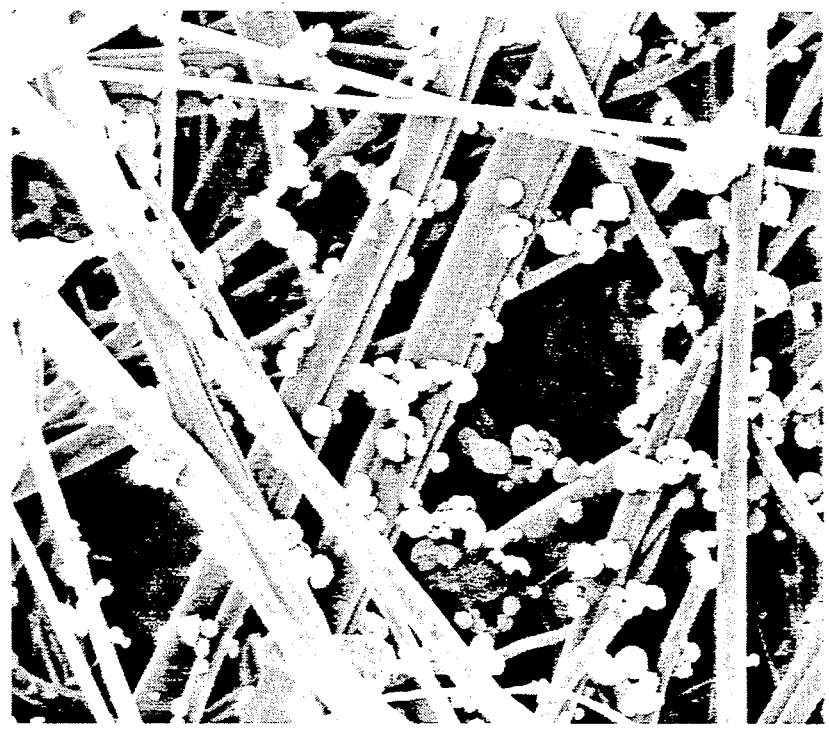
FIG. 3 is a micrograph of the electret sheet (magnified by 700).

FIGS. 1 and 3 show an electret sheet of the invention. In the electret sheet, the charge is retained in the fibers 1, in the particles 2 and 3, and at the interfaces between the fibers 1 and the particles 2 and 3. As the particles mentioned above, it is possible to use particles which can be electrified or particles which cannot be electrified. As the fibers, however, it is necessary to use fibers which can be electrified, because when fibers which cannot be electrified are used, the charge is not retained in the sheet stably, so that an electret sheet with a great amount of electrostatic charge cannot be obtained.

The electret sheet with a great amount of electrostatic charge of the invention can stably retain a greater amount of charge than the total amount of respective charges which are independently retained by the fibers and the particles. The reason for this is probably that when the fibers with the particles are electrified, in addition to the charges which are independently retained by the fibers and the particles, charge is also retained at the interfaces between the fibers and the particles in the electret sheet by interaction between the fibers and the particles. By these features, the electret sheet of the invention is distinguished from conventional electret sheets. Another feature of the electret sheet of the invention is that the charge which resulted from the interaction between the fibers and the particles does not easily disappear with the passage of time, but is stably retained in the electret sheet of the invention.

As the fibers that constitute the porous sheet mentioned above, short fibers and long fibers can be used. As the porous sheet in which the fibers are used, textile fabrics, knitted fabrics, or non-woven fabrics can be used, as mentioned above. The crosssection of these fibers can be circular, triangular, rectangular, or irregular. The diameter of these fibers is 100 $\mu$m or less, being preferably 40 $\mu$m or less, and more preferably in the range of 0.01–4 $\mu$m.

The surfaces of the fibers to be used are first treated with ultraviolet rays or radiant rays of high energy; first treated with acid, alkali, or the like; or first coated with coating materials so that the charge can be stably retained and the amount of electrostatic charge can be increased in the electret sheet.

The particles mentioned above can be formed from inorganic substances, organic substances, or a mixture thereof that is solid at room temperature. Specifically, the particles can be made of ceramics such as glass; metals such as copper, nickel, and aluminum; metal oxides such as titanium oxide, silicon oxide, iron oxide, and barium titanate; metal nitrides such as nickel nitride and titanium nitride; inorganic substances such as carbon and talc; carboxylic acids such as stearic acid and sebacic acid or metal salts thereof; carnauba wax; rosin; or organic substances such as polyethylene, polypropylene, polyethylene terephthalate, polyamide, polyvinylidene fluoride, polytetrafluoroethylene, polystyrene, polyvinyl chloride, polyvinylidenechloride, cellulose, and polyvinyl alcohol. Among the above-mentioned substances, carbon, aluminum, polyethylene, sebacic acid, and carnauba wax are especially preferred.

The size of the individual particles is preferably 50 $\mu$m or less, being more preferably 1 $\mu$m or less, and most preferably 0.001–0.2 $\mu$m. It is preferred that the particles are added to the surfaces of the fibers in the form of primary particles which consist of only one particle and which lie on the surfaces of the fibers independently, but the particles can also be aggregated into groups of secondary particles which consist of several particles and which lie on the surfaces of the fibers independently.

The shape of the particles can be a sphere, an oval, a cubic, a rectangular parallelepiped, a sphere with projections, a hollow truncated cone, a truncated pyramid, or an obelisk.

The amount of the particles to be added to the fibers is preferably 0.01–20% by weight based on the weight of the fibers, being more preferably 0.05–5% by weight based on the weight of the fibers, and most preferably 0.1–1% by weight based on the weight of the fibers. The smaller the size of the particles is, the greater the surface area of the particles per unit weight and the area of the interface between the particles and the fibers become. Accordingly, even if the amount of the particles to be added to the porous sheet is small, the amount of electrostatic charge of the electrified porous sheet with these particles is still great, provided that the size of the particles is small.

The particles are directly bonded to the fibers, or they are bonded to the fibers by bonding forces or powers between the fibers and the particles, such as the force of static electricity, adhesive power, van der Waals forces, or the force developed by means of water resulting from capillarity. Accordingly, the particles do not easily come off the fibers by wind pressure or vibration while the electret sheet is being used.

One method of providing the fibers with the particles is as follows: The particles are dispersed into gas and then brought onto the surfaces of the fibers; or they are produced by the application of heat or in the process of evacuation to be brought onto the surfaces of the fibers. The above-mentioned fibers can be electrified or not, as preferred, in advance.

According to the invention, the electrification of the porous sheet with the particles can be carried out by corona discharge, by applying an electric field, by applying an electric field with heating, and by irradiation of electron beams, but the method of electrification is not limited thereto. Any method can be used provided that the porous sheet with the particles has a great amount of electrostatic charge as a result of the injection of charge into the porous sheet with the particles and provided that the charge is stably retained in the resultant electret sheet, but electrification by corona discharge is especially preferred. When the electrification is carried out by the corona discharge or by applying an electric field, the intensity of the electric field is preferably 10 kV/cm or more, and more preferably 15 kV/cm. When the electrification is carried out by the irradiation of electron beams, the amount of irradiation is preferably in the range of 0.1–1 Mrad.

Below, an electret sheet with metal deposits, which is another embodiment of the invention, is described.

The metal deposits are usually formed from vaporized metals brought onto the surfaces of the fibers under reduced pressure. The thickness of the metal deposits is preferably 500 Å or less, being more preferably 200 Å or less, and most preferably 10–100 Å, depending on the electric resistance of the metal deposits, which is measured by means of a Conduct Meter CDM-3 (Hitachi Seisakusho).

In this case also, metal deposits are added to the porous sheet and spaced at various intervals. When the thickness of the metal deposits is not sufficient, the metal deposits cannot be formed into films but are formed into particles added to the porous sheet. Metal deposits formed into particles are advantageous, as are metal deposits formed into films. The metal deposits can be formed on both surfaces of the porous sheet or inside the porous sheet.

The metal deposits can be made of aluminum, silver, tin, copper, or the like. When silver, tin, or copper is used to form the metal deposits among the above-mentioned substances, it is possible to provide the electret sheet with antibacterial activity.

The electret sheet of the invention has a ratio of single-fiber collection efficiency of 1.5 or more, which is given by Equation 1 as shown below.

$$\eta/\eta_0 = \ln(1-E)/\ln(1-E_0) \quad (1)$$

wherein $\eta_0$ is the single-fiber collection efficiency of the electret sheet manufactured by the conventional method; $\eta$ is the single-fiber collection efficiency of the electret sheet of the invention; $E_0$ is the particle-collection efficiency of the electret sheet manufactured by the conventional method; E is the particle-collection efficiency of the electret sheet of the invention.

The above-mentioned electret sheet manufactured by the conventional method does not have particles on its fibers and is electrified by the same procedure as that of the invention.

The particle-collection efficiency mentioned above was calculated as follows: NaCl particles with a diameter of 0.3 μm were brought to a test sheet at a linear velocity of 5 cm/sec and then the density of the NaCl particles was measured upstream and downstream of the sheet by means of a Laser Particle Counter KC-14 (Rion). The particle-collection efficiency was given by Equation 2 as shown below.

$$E = \frac{C_1 - C_2}{C_1} \quad (2)$$

wherein $C_1$ is the concentration of the NaCl particles upstream of the test sheet; and $C_2$ is the concentration of the NaCl particles downstream of the test sheet.

From the single-fiber collection efficiency of the electret sheet of the invention being 1.5 times that of the electret sheet manufactured by the conventional method, it can be seen that the increased collection efficiency of the electret sheet of the invention is mainly due to the marked increases in electrostatic collection efficiency and not so much to the slight increase in the mechanical collection efficiency; that is, it can be seen that the electret sheet of the invention has more electrostatic charge than the electret sheet manufactured by the conventional method.

According to the invention, the amount of electrostatic charge (the surface charge density) of the electret sheet is 0.8 nC/cm² or more. The amount of electrostatic charge of the electret sheet which is manufactured by the conventional method is in the range of 0.3–0.6 nC/cm² and cannot be more than 0.6 nC/cm². When the amount of electrostatic charge of the conventional electret sheet is less than 0.8 nC/cm², the ratio of particle-collection efficiency mentioned above of 1.5 or more cannot be obtained.

The surface charge density $\rho$ can be obtained by the following procedure: When an electret sheet is used to collect particles, the primary factor of increasing the particle-collection efficiency of the electret sheet is electrostatic force. Accordingly, the particle-collection efficiency of the electret sheet is given by the following Equation 3, if other factors can be ignored.

$$E_t = E_e \quad (3)$$

wherein $E_t$ is the particle-collection efficiency of an electret sheet and $E_e$ is the particle-collection efficiency of an electret sheet by electrostatic force.

Equation 3 is used to obtain the following Equations 4 and 5:

$$\ln(1-E_t) = K \cdot \eta_e \quad (4)$$

$$K = \frac{-4\alpha L}{\pi(1-\alpha)d_f} \quad (5)$$

wherein $\eta_e$ is the single-fiber collection efficiency resulting from electrostatic force; $\alpha$ is the ratio; L is the thickness; and $d_f$ is the diameter of fibers.

The particles used for the test are in an equilibrium charged state. Therefore, the single-fiber collection efficiency resulting from electrostatic force is given by the following Equation 6.

$$\eta_e = \eta_C + \eta_{in} \tag{6}$$

wherein $\eta_c$ is the single-fiber collection efficiency resulting from Coulombic force and $\eta_{in}$ is the single-fiber collection efficiency resulting from induced force.

$\eta_c$ and $\eta_{in}$ are also given by the following Equations 7 and 8.

$$\eta_c = \frac{Cm \cdot q \cdot \rho}{3 \cdot \epsilon_o \cdot \mu \cdot dp \cdot u} \tag{7}$$

$$\eta_{in} = 2\left(\frac{\epsilon_p - 1}{\epsilon_p + 2} \cdot \frac{Cm \cdot dp^2 \cdot \rho^2}{3 \cdot \epsilon_o \cdot \mu \cdot df \cdot u \cdot h_k}\right)^{\frac{1}{2}} \tag{8}$$

wherein Cm is the Cunningham correction factor; q is the amount of electrostatic charge of a particle; $\rho$ is the surface charge density; $\epsilon_o$ is the permittivity of free space pressure; $\mu$ is the viscosity of the air; $\epsilon_p$ is the permittivity of a particle; u is the filtration speed; and $h_k$ is the hydrodynamic factor.

Considering the contribution of induced force to an un-charged particle and that of Coulombic force to a charged particle, $\eta_e$ is given by the following Equation 9.

$$\exp(K\eta_e) = N_o \exp(K\eta_{in}) + N_{iexp}(K\eta_{cl}) + \ldots + N_n \exp(K\eta_{cn}) \tag{9}$$

wherein $\eta_{cn}$ is the single-fiber collection efficiency resulting from Coulomb force acting on a charged particle with n charges; and $N_n$ is the ratio of particles with n charges to the total number of particles.

By use of a computer simulation, the surface charge density $\rho$ of the electret sheet which solves Equation 9 is given by the measured particle-collection efficiency of the sheet and Equations 4, 5, 6, 7, and 8.

EXAMPLES

Example 1

Fibers with the diameter of 1.5 μm were formed from polypropylene by the melt blown method. These fibers were formed into a non-woven sheet A (wherein 30 g/m² fibers are contained), which was then coated with particles of silicon oxide with a diameter of 0.02 μm by the following procedure: The non-woven sheet mentioned above was treated with a blast of particles of silicon oxide with the use of an air ejector so that the particles of silicon oxide, some of which passed through the non-woven sheet, could move at the speed of 5 cm/sec, resulting in the non-woven sheet B coated with 0.1 g/m² particles of silicon oxide.

Then, a sheet made of a semiconductor material, the above-mentioned non-woven sheet B with particles of silicon oxide, and an electrode with needles for corona discharge were successively disposed on the surface of an earthed electrode in that order, followed by the application of 20 kV/cm high voltage for 4 seconds, resulting in an electret sheet. The collection efficiency of NaCl particles (which were moving at the linear velocity of 5 cm/sec and had a diameter of 0.3 μm) with this electret sheet was measured by a Laser Particle Counter KC-14 (Ricon) and the pressure loss of the electret sheet was measured by a manoster gauge.

Control Example 1

The non-woven sheet A without the particles obtained in Example 1 was electrified under the same conditions as that of Example 1, resulting in an electret sheet. The particle-collection efficiency and the pressure loss of the resultant electret sheet were measured under the same conditions as in Example 1.

The results of the tests obtained in Example 1 and Control Example 1 are shown in Table 1.

TABLE 1

| Properties | Example 1 | Control Example 1 |
|---|---|---|
| Particle-collection efficiency (%) | 99.98 | 98.1 |
| Pressure loss (mm H₂O) | 3.3 | 2.7 |
| $\eta/\eta_o$ | 2.1 | 1.0 |
| Amount of electrostatic charge (nC/cm²) | 1.1 | 0.5 |

The pressure loss of Example 1 is 1.2 times that of Control Example 1, which indicates that the pressure loss of Example 1 is slightly greater than that of Control Example 1. The ratio of the single-fiber collection efficiencies $\eta/\eta_o$ is 2.1, which is much increased.

Example 2

Particles of carbon black with a diameter of 0.1 μm were produced in the process of incomplete combustion of liquefied petroleum gas. The electrified non-woven sheet C obtained in Control Example 1 was treated with a blast of the particles of carbon black mentioned above so that the particles of carbon black, some of which passed through the non-woven sheet, could move at the speed of 10 cm/sec, resulting in a sheet coated with 0.2 g/m² particles of carbon black. Then, following the method of Example 1, a sheet of a semiconductor material and the above-mentioned electrified non-woven sheet with the particles of carbon black were successively disposed on the surface of an electrode in that order, followed by the application of 20 kV/cm high voltage with the use of an electrode with needles for corona discharge positioned above the sheets, resulting in an electret sheet.

The collection efficiency and the pressure loss of the electret sheet were measured under the same conditions as in Example 1.

CONTROL EXAMPLE 2

The electrified non-woven sheet C obtained in Control Example 1 was treated with a blast of particles of carbon black with a diameter of 0.1 μm so that the particles of carbon black, some of which passed through the electrified non-woven sheet, could move at the speed of 10 cm/sec, resulting in an electret sheet coated with 0.2 g/m² particles of carbon black.

The collection efficiency and the pressure loss of the sheet were measured under the same conditions as in Example 2.

The results of the tests obtained in Example 2 and Control Example 2 are shown in Table 2.

TABLE 2

| Properties | Example 2 | Control Example 2 | Control Example 3 |
|---|---|---|---|
| Particle-collection efficiency (%) | 99.992 | 98.4 | 98.1 |
| Pressure loss (mm H$_2$O) | 3.5 | 3.5 | 2.7 |
| $\eta/\eta_o$ | 2.4 | 1.04 | 1.0 |
| Amount of electrostatic charge (nC/cm$^2$) | 1.1 | 0.5 | 0.5 |

The pressure loss of Example 2 is 1.3 times that of Control Example 1 and the ratio $\eta/\eta_o$ of the single-fiber collection efficiencies of Example 2 is 2.4, which indicates that the electret sheet of Example 2 has considerably more electrostatic charge.

On the contrary, the pressure loss of Control Example 2 has increased and is 1.3 times that of Control Example 1. The ratio $\eta/\eta_o$ of the single-fiber collection efficiencies of Control Example 2 is 1.04, and compared to that of Control Example 1, there is only a slight difference therebetween.

It can be seen from the results of the tests mentioned above that when the fibers are electrified first and then provided with particles, they cannot retain much electrostatic charge. When the fibers are provided with particles first and then electrified, they can retain much electrostatic charge.

Control Example 3

The electrified non-woven sheet C obtained in Control Example 1, which was not provided with particles, was again electrified under the same conditions as in Example 2, so that an electret sheet that was electrified twice could be obtained.

The collection efficiency and the pressure loss of the resulting sheet were measured under the same conditions as in Example 2, and the results are shown in Table 2, indicating that the twice-electrified sheet did not have increased collection efficiency.

Example 3

Polytetrafluoroethylene was formed by spraying into dried particles with a diameter of 0.3 μm. A sheet of span bond that was formed from fibers of polypropylene with a diameter of 10 μm (wherein 40 g/m$^2$ fibers were contained) was treated with a blast of the particles of polytetrafluoroethylene mentioned above, so that the particles, some of which passed through the sheet of span bond, could move at the speed of 10 cm/sec, resulting in an sheet coated with 0.4 g/m$^2$ particles of polytetrafluoroethylene. Then, the sheet with the particles of polytetrafluoroethylene was electrified under the same conditions as in Example 2 so as to form an electret sheet. The collection efficiency and the pressure loss of the electret sheet were measured under the same conditions in Example 2, and the results are shown in Table 3.

Example 4

Aluminum was deposited to the thickness of 200 Å on a sheet of span bond, which was formed from fibers of polypropylene (wherein 40 g/m$^2$ fibers were contained), by vacuum vapor deposition in a bell jar.

Then, the sheet was electrified under the same conditions as in Example 1, resulting in an electret sheet. The collection efficiency and the pressure loss were measured under the same conditions as in Example 1, and the results are shown in Table 3.

Control Example 4

A span bond sheet which was formed from fibers of polypropylene with a diameter of 10 μm and which was not provided with particles (wherein 40 g/m$^2$ fibers were contained) was electrified under the same conditions as in Example 2, resulting in an electret sheet. Then, the collection efficiency and the pressure loss of the electret sheet were measured under the same conditions as in Example 2, and the results are shown in Table 3.

TABLE 3

| Properties | Example 3 | Example 4 | Control Example 4 |
|---|---|---|---|
| Particle-collection efficiency (%) | 82 | 78 | 60 |
| Pressure loss (mm H$_2$O) | 0.6 | 0.5 | 0.5 |
| $\eta/\eta_o$ | 1.87 | 1.65 | 1.00 |

The ratios of the single-fiber collection efficiencies $\eta/\eta_o$ of the electret sheets obtained in Examples 3 and 4 to the single-fiber collection efficiency of the sheet of Control Example 4 were 1.5 or more.

Then, the surface potentials of the electret sheets obtained in Example 2, Control Example 1, and Control Example 2 were measured by use of a Surface Electrometer S-211 (Kawaguchi Denki), and the results are shown in Table 4, indicating that the surface potential of the electret sheet of Example 2 is very high.

TABLE 4

|  | Example 2 | Control Example 1 | Control Example 2 |
|---|---|---|---|
| Surface potential | −870 | −350 | −60 |

Example 5

Fibers of polypropylene with a diameter of 1.5 μm were made by the melt blown method and then formed into a non-woven sheet D (wherein 30 g/m$^2$ fibers were contained). Then, on the surface of the fibers of the resultant non-woven sheet D, silver was deposited by vacuum vapor deposition to the thickness of 300 Å.

Thereafter, a sheet of a semiconductor material and the above-mentioned sheet with silver deposits were successively disposed on the surface of an earthed electrode in that order, followed by the application of high voltage of 20 kV/cm for 4 seconds by use of an electrode with needles for corona discharge positioned above the sheets, resulting in an electret sheet. The collection efficiency and the pressure loss of the resultant electret sheet were measured under the same conditions as in Example 1. The results of the tests obtained in Example 5 and Control Example 1 are shown in Table 5.

TABLE 5

| Properties | Example 5 | Control Example 1 |
|---|---|---|
| Particle-collection efficiency (%) | 99.9 | 98.1 |
| Pressure loss (mm H$_2$O) | 2.7 | 2.7 |
| $\eta/\eta_o$ | 1.8 | 1.0 |

Table 5 shows that the pressure loss of Example 5 is equal to that of Control Example 1, but that the ratio of single fiber-collection efficiencies $\eta/\eta_o$ of Example 5 is much increased, indicating that the porous sheet with metal deposits is advantageous.

Example 6

On the non-woven sheet D formed by the melt-blown method in Example 5, aluminum was deposited by vacuum vapor deposition to the thickness of 50 Å.

Then, a sheet of a semiconductor material and the above-mentioned sheet with aluminum deposits were successively disposed on the surface of an earthed electrode in that order, followed by the application of high voltage of 20 kV/cm for 4 seconds by use of an electrode with needles for corona discharge positioned above the sheets, resulting in an electret sheet. The collection efficiency and the pressure loss of the resulting electret sheet were measured under the same conditions as in Example 1.

Control Example 5

On the electrified non-woven sheet C obtained in Control Example 1, aluminum was deposited by vacuum vapor deposition to the thickness of 50 Å.

The collection efficiency and the pressure loss of the resultant sheet were measured under the same conditions as in Example 2. The results of the tests obtained in Example 6 and Control Example 5 are shown in Table 6.

TABLE 6

| Properties | Example 6 | Control Example 5 |
|---|---|---|
| Particle-collection efficiency (%) | 99.95 | 98.2 |
| Pressure loss (mm H$_2$O) | 2.7 | 2.7 |
| $\eta/\eta_o$ | 2.8 | 1.0 |

It can be seen from the results of Control Example 5 that the sheet which was electrified and then provided with metal deposits does not have an increased amount of electrostatic charge.

It can be seen from the results of Example 6 that the sheet which was provided with thin metal deposits has a much increased amount of electrostatic charge.

Example 7

On a sheet of span bond which was formed from fibers of polypropylene with a diameter of 4 μm (wherein 40 g/m$^2$ fibers were contained), copper was deposited by vacuum vapor deposition to the thickness of 100 Å. Then, the sheet with metal deposits was electrified under the same conditions as in Example 5, resulting in an electret sheet. The collection efficiency and the pressure loss of the resultant electret sheet were measured under the same conditions as in Example 5, and the results are shown in Table 7.

Control Example 6

The sheet of span bond of Example 7 which was not provided with metal deposits was electrified following the method of Example 5, so that an electret sheet was obtained. The collection efficiency and the pressure loss of the resultant electret sheet were measured under the same conditions as in Example 5, and the results are shown in Table 7.

TABLE 7

| Properties | Example 7 | Control Example 6 |
|---|---|---|
| Particle-collection efficiency (%) | 96 | 85 |
| Pressure loss (mm H$_2$O) | 1.2 | 1.2 |
| $\eta/\eta_o$ | 1.7 | 1.0 |

Then, the surface potentials of the electret sheets obtained in Example 6, Control Example 1, and Control Example 5 were measured by the use of a Surface Electrometer S-211 (Kawaguchi Denki), and the results are shown in Table 8, indicating that the surface potential of the electret sheet obtained from the porous sheet, which was provided with metal deposits first and then electrified, is considerably high.

TABLE 8

| | Example 6 | Control Example 1 | Control Example 5 |
|---|---|---|---|
| Surface potential (V) | −850 | −415 | −275 |

Figure 2:
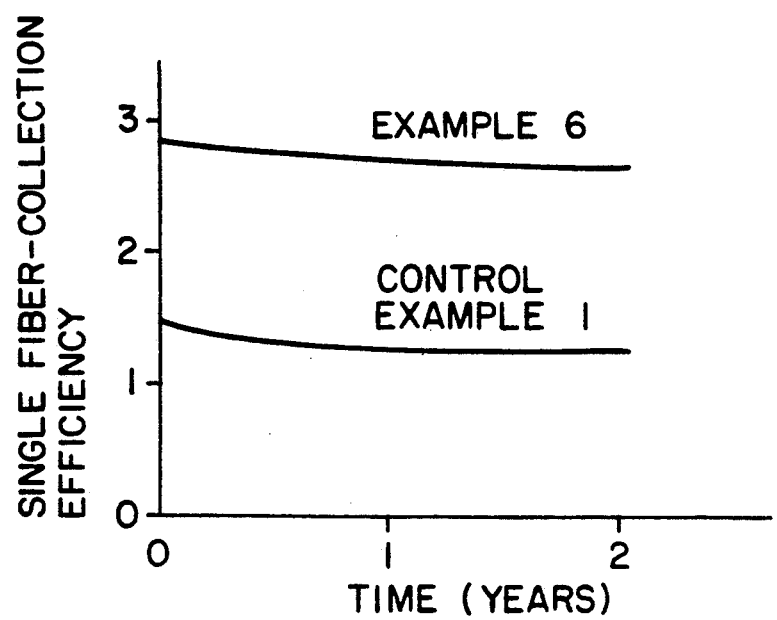
FIG. 2 is of a graph showing the single fiber-collection efficiencies of the electret sheets obtained in Example 6 and Control Example 1, respectively, which change with the passage of time.

FIG. 2 shows the single-fiber collection efficiencies which change with the passage of time, of the electret sheets obtained in Example 6 and Control Example 1. It can be seen from the figure that the collection efficiency of the electret sheet obtained in Example 6 remains higher even after the passage of time than that of the electret sheet obtained in Control Example 1.

Example 8

Sebacic acid was heated at 300° C. to vaporize in an atmosphere of nitrogen and then cooled at room temperature so that particles of sebacic acid with a mean diameter of 1 μm were obtained.

The non-woven sheet C formed by the melt blow method in Control Example 1 was provided with the particles of sebacic acid with a mean diameter of 1 μm following the procedure shown below: The non-woven sheet formed by the melt blown method in Control Example 1 was treated with a blast of the particles of sebacic acid so that the particles, some of which passed through the non-woven sheet with the air, could move at the speed of 5 cm/s.

Then, following the method of Example 1, a high voltage of 20 kV/cm was applied to the non-woven sheet with the particles for 4 seconds, resulting in an electret sheet with much electrostatic charge.

The collection efficiency and the pressure loss of the resultant electret sheet were measured, following the method of Example 1, and the results are shown in Table 9.

TABLE 9

| Properties | Example 8 |
|---|---|
| Particle-collection efficiency (%) | 99.995 |
| Pressure loss (mm H$_2$O) | 3.1 |
| $\eta/\eta_o$ | 2.3 |
| Amount of electrostatic charge (nC/cm$^2$) | 1.6 |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electret sheet comprising a porous sheet made of a dielectric polymer and at least one solid material selected from the group consisting of (1) organic materials that are solid at room temperature and consist of organic carboxylic acids, metal salts of organic carboxylic acids, polyethylene, polypropylene, polyethylene terephthalate, polyamide, polyvinylidene fluoride, polytetrafluoroethylene, polystyrene, polyvinyl chloride, polyvinylidene chloride, cellulose, or polyvinyl alcohol; (2) inorganic materials that are ceramics, metal nitrides, or carbon black; and (3) metallic materials that consist of aluminum, silver, tin, nickel, or copper, said porous sheet having said material in particulate form spaced at various intervals on the surface of the dielectric polymer, wherein said sheet having the material in particulate form on the surface thereof has been electrified while said material in particulate form is present.

2. An electret sheet according to claim 1, wherein said porous sheet is selected from the group consisting of textile fabrics, knitted fabrics, non-woven fabrics, porous films, and porous foams.

3. An electret sheet according to claim 1, wherein said dielectric polymer is a fiber selected from the group consisting of fibers made of polyolefin, polyvinylidenechloride, and polycarbonate.

4. An electret sheet according to claim 3, wherein the diameter of said fiber is in the range of 0.01–100 $\mu$m.

5. An electret sheet according to claim 1, wherein the size of said particles is in the range of 0.001–50 $\mu$m.

6. An electret sheet according to claim 1, wherein the amount of said particles to be added to the porous sheet is in the range of 0.01–20% by weight based on the weight of the porous sheet.

* * * * *